C. F. JOHNSON.
THERMOSTATIC CONTROL DEVICE.
APPLICATION FILED MAR. 19, 1914.
1,110,137.
Patented Sept. 8, 1914.
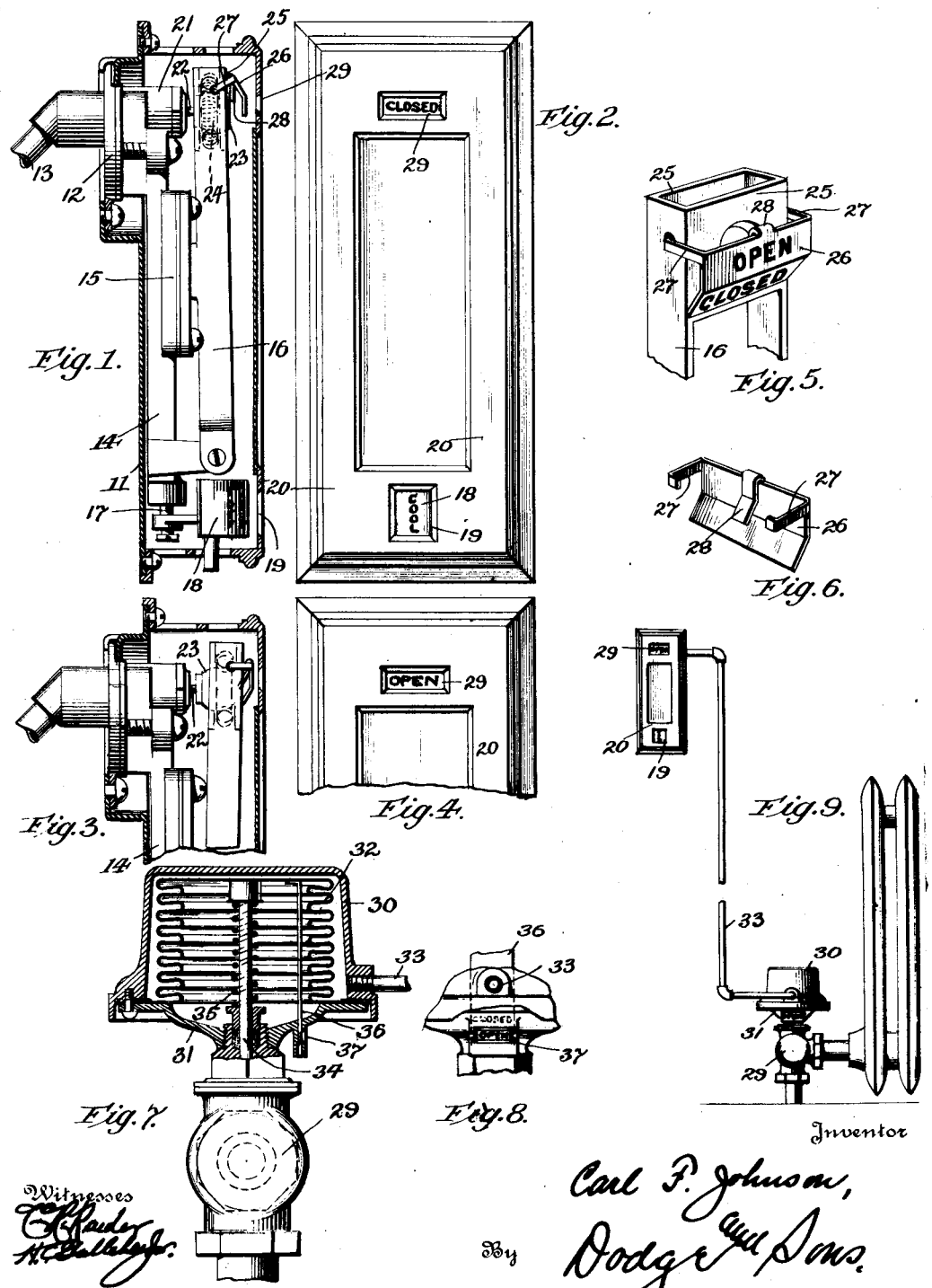

UNITED STATES PATENT OFFICE.

CARL F. JOHNSON, OF MILWAUKEE, WISCONSIN, ASSIGNOR TO JOHNSON SERVICE COMPANY, OF MILWAUKEE, WISCONSIN, A CORPORATION OF WISCONSIN.

THERMOSTATIC CONTROL DEVICE.

1,110,137.  Specification of Letters Patent.  Patented Sept. 8, 1914.

Application filed March 19, 1914. Serial No. 825,819.

*To all whom it may concern:*

Be it known that I, CARL F. JOHNSON, a citizen of the United States, residing at Milwaukee, in the county of Milwaukee and State of Wisconsin, have invented certain new and useful Improvements in Thermostatic Control Devices, of which the following is a specification.

This invention relates to automatic control devices for heating systems and the like and particularly to a system of indicating devices which will indicate at a glance the condition of the control mechanism and whether the controlled device is responding properly to the action of the automatic controller.

The invention is illustrated as applied to the Johnson system of temperature regulation and the thermostat chosen for illustrative purposes is that described and claimed in my copending application, Serial No. 798,603, filed October 31, 1913. Consequently no claims are here made to the specific structure of the thermostat proper. In the present invention I do not limit myself to the use of this particular form of thermostat or to the particular system of control above mentioned, as it is applicable by slight modification to others.

The Johnson system of regulation ordinarily includes a primary motor for operating a radiator valve, a damper or similar mechanism, and a pilot valve for alternately admitting and releasing pressure to and from the primary motor to close and open the radiator valve or the damper, etc. The pilot valve is actuated by a secondary motor through an interposed quick throw mechanism designed to insure the sudden throwing of the pilot valve between its admission and release positions, the secondary motor assuming one or another position accordingly as a vent or leak port therefrom is opened or closed by a thermostatic control valve. It has heretofore been proposed to attach an indicating device to the motor arm of the secondary motor but such an arrangement is valueless because it will indicate incorrectly if the pilot valve or the quick throw sticks because of some derangement. Furthermore without means of determining the condition of the primary motor, which is usually so cased as not to reveal its condition, an indicator such as above mentioned has only limited practical utility.

My present invention provides a means for determining by ready inspection whether the secondary motor, the quick throw device and the pilot valve are operating properly and also whether the primary motor is responding to the action of the pilot valve. It involves the use of an indicator which will indicate the response of the quick throw and pilot valve to the movement of the primary motor and a second indicator to show the response of the primary motor to the action of the pilot valve.

An embodiment is illustrated in the drawing in which:—

Figure 1 is a vertical axial section of a thermostat showing my improved indicator applied, the thermostat being in "closed" position, *i. e.* with the pilot valve in admission position admitting air to the primary motor to close the radiator valve; Fig. 2 is a front elevation of the thermostat in the position of Fig. 1; Fig. 3 is a fragmentary vertical section similar to Fig. 1 but showing the thermostat in "open" position; Fig. 4 is a fragmentary front elevation of the thermostat in the position of Fig. 3; Fig. 5 is a perspective view of the motor arm and quick throw cam ball with indicator attached; Fig. 6 is a rear perspective view of the indicator; Fig. 7 is a vertical section of the primary motor attached to a radiator valve and provided with an indicator forming part of my system; Fig. 8 is a fragmentary elevation showing the appearance of the primary motor indicator; and Fig. 9 is a diagram indicating the connection of the thermostat and primary motor and designed to illustrate the interrelation of the two indicators.

The thermostat is mounted by means of a wall plate 11 to which is attached the pipe head 12 having two pipe connections of usual form one of which appears at 13. One is for the connection of the pressure supply pipe and the other for the connection of the control pipe to the secondary motor in the usual manner. Carried on the pipe head 12 is the thermostat frame 14 and the secondary motor 15. The motor 15 operates the motor arm 16, and is itself controlled by a thermostatic bar of the usual type, which is not visible in the drawings, being concealed by the motor arm. An adjusting screw 17 adjusts the thermostatic bar to the desired temperature and the adjustment is indicated by the movable dial 18 carried on screw 17 and readable through aperture 19 in the case 20.

The pilot valve is of the usual form inclosed in a case 21 and is actuated by a stem 22 carrying a ball or cam 23. The ball 23 is surrounded by an annular contractile coil spring 24 which is confined between spaced plates 25 at the upper end of arm 16. The ball 23 works through suitable apertures in plates 25 and snaps to one side or the other of ball 23 as arm 16 swings between its limiting positions under the action of motor 15, thus imparting a quick throw to the pilot valve by means of a slow movement of arm 16.

The construction of the parts above mentioned is more fully described in my prior application above identified but the present description is sufficient for a disclosure of my present invention, particularly as this is applicable to thermostats differing in detail from that chosen for illustration.

The indicator for the pilot valve consists of a sheet metal member 26 having two indicating faces bearing the words "Open" and "Closed" respectively. Any other suitable legends might be substituted. The member 26 is pivoted on the arm 16 by means of the rearwardly extending arms 27 and carries a lug 28 which rests against the forward end of cam 23. The indicator is read through an aperture 29 in case 20. When the arm 16 swings back due to the venting of motor 15 by the thermostatic bar, the cam 23 snaps forward. In doing so it moves the pilot valve to admission position, and engages lug 28 to move the indicator so the word "Closed" reads through aperture 29 (see Figs. 1 and 2). If thereafter the thermostatic bar closes the vent from motor 15 the increase of pressure therein swings arm 16 out and spring 24 snaps cam 23 back. This moves the pilot valve to exhaust position and allows indicator 26 to drop, so that the word "Open" reads through aperture 29. (See Figs 3 and 4). The indicator 26 is so formed with reference to the center about which it turns that the lower indicating face will swing forward when moving to indicating position thus compensating for the rearward movement of arm 16. The action of the indicator obviously is such as not only to indicate whether motor 15 has acted, but also to indicate whether the quick throw has acted completely to shift the pilot valve.

The above feature is of great importance but derives even greater utility in combination with an indicating primary motor for the radiator valve or kindred mechanism. This primary motor is illustrated in Fig. 7 as applied to a radiator valve. The main casing of the valve proper which is of the globe type is indicated at 29. Upon this is mounted the primary motor casing formed in two separable parts 30 and 31 and divided internally into two chambers by a metal bellows diaphragm 32. To the space above diaphragm 32 is connected the control pipe 33 so that the admission of pressure through pipe 33 will force diaphragm 32 downward moving valve stem 34 downward in opposition to spring 35 to close the radiator valve. The space below diaphragm 32 is open to the atmosphere. The diaphragm 32 carries an indicator strip 36 which bears the legends "Open" and "Closed." The strip 36 passes through a slot in casing 31 and one or another of the legends thereon may be read through aperture 37 accordingly as the valve is in one or another condition.

The conjoint use of the primary motor valve indicator and the pilot valve indicator permits ready location of any derangement of the system without requiring the dismounting of any mechanism. This result cannot be secured by means of indicators which merely show the condition of the secondary motor in the manner heretofore suggested.

As described in my prior application, above identified, the control mechanism may be converted into a hygrostat by the substitution of a hygrostatic element for the thermostatic element, and obviously the indicating features herein described are equally applicable to hygrostats, and I use the term "control device" in the claims broadly to cover thermostats, hygrostats and similar mechanism.

Having thus described my invention, what I claim is:—

1. The combination with a motor actuated control device including a responsive element, a motor controlled thereby, a pilot valve, and a quick throw device forming an operative connection between said motor and valve, of an indicator adapted to be actuated by the operation of said quick throw device to indicate the position of the pilot valve.

2. The combination with a motor actuated control device including a responsive element, a motor controlled thereby, a pilot valve, and a quick throw device forming an operative connection between said motor and valve, of an indicator adapted to be actuated by the movement of said pilot valve under the influence of said quick throw device.

3. The combination with a motor actuated control device including a responsive element, a motor controlled thereby, an actuator adapted to be moved by said motor, a pilot valve and a quick throw device forming an operative connection between said actuator and valve, of an indicator mounted on said actuator and adapted to be operated by the operation of said quick throw device to indicate the position of the pilot valve.

4. The combination with a motor actuated control device including a responsive element, a motor controlled thereby, a pivoted motor arm adapted to be moved by said motor, a pilot valve, and a quick throw device forming an operative connection between said arm and valve; of a case provided with an aperture; and an indicator dial having indicating legends, pivoted on said motor arm and adapted to be moved by the actuation of said quick throw device under movements of said arm to present one or another legend at said aperture to indicate the position of said pilot valve.

5. The combination with a motor actuated control device including a responsive element, a motor controlled thereby, a pivoted motor arm adapted to be moved by said motor, a pilot valve, and a quick throw device forming an operative connection between said arm and valve; of a case provided with an aperture; and an indicator dial having indicating legends, pivoted on said motor arm and adapted to be engaged and moved by a portion of said pilot valve to present one or another legend at said aperture and indicate the position of said pilot valve.

6. The combination with an automatic control system including a primary motor, a valve or the like controlled thereby, and an automatic control device having a pilot valve adapted to control the action of said primary motor; of an indicator in operative relation with said pilot valve to indicate the condition thereof; and a second indicator in operative relation with said primary motor to indicate the condition thereof.

In testimony whereof I have signed my name to this specification in the presence of two subscribing witnesses.

CARL F. JOHNSON.

Witnesses:
J. W. WALLACE,
J. R. TATUM.